(12) United States Patent
Mostert

(10) Patent No.: US 7,909,055 B2
(45) Date of Patent: Mar. 22, 2011

(54) VALVE PROVIDED WITH A PASSAGE FOR CONVEYING A MEDIUM AND AN INSTALLATION PROVIDED WITH SUCH A VALVE

(75) Inventor: Gerard Mostert, Rozenburg (NL)

(73) Assignee: Maasland N.V., Maassluis (NL)

( * ) Notice: Subject to any disclaimer, the term of this patent is extended or adjusted under 35 U.S.C. 154(b) by 414 days.

(21) Appl. No.: 11/643,715

(22) Filed: Dec. 22, 2006

(65) Prior Publication Data

US 2007/0144586 A1 Jun. 28, 2007

(30) Foreign Application Priority Data

Dec. 23, 2005 (NL) ...................................... 1030757

(51) Int. Cl.
*F16K 31/36* (2006.01)
*A01J 5/04* (2006.01)

(52) U.S. Cl. .................. 137/494; 137/516.25; 137/901; 137/907; 119/14.43

(58) Field of Classification Search .................. 137/494, 137/519.5, 901, 907, 516.25; 119/14.42, 119/14.43, 14.44, 14.46
See application file for complete search history.

(56) References Cited

U.S. PATENT DOCUMENTS

| | | | | |
|---|---|---|---|---|
| 1,656,124 A | * | 1/1928 | Melotte | 137/198 |
| 1,989,870 A | | 2/1935 | Lafferty, Jr. | |
| 2,942,618 A | | 6/1960 | Hodges | |
| 3,114,387 A | * | 12/1963 | Barkan et al. | 137/494 |
| 3,905,408 A | * | 9/1975 | Hale | 144/178 |
| 3,948,285 A | * | 4/1976 | Flynn | 137/494 |
| 4,312,376 A | * | 1/1982 | Allen | 137/494 |
| 4,685,584 A | * | 8/1987 | Harris | 137/43 |
| 4,968,221 A | * | 11/1990 | Noll | 137/907 |
| 5,129,414 A | * | 7/1992 | Glass et al. | 137/10 |
| 5,195,496 A | * | 3/1993 | Gokhale | 123/643 |
| 5,284,180 A | * | 2/1994 | Guo et al. | 137/488 |
| 5,769,025 A | | 6/1998 | Van Der Lely et al. | |
| 6,149,125 A | | 11/2000 | Nilsson et al. | |

FOREIGN PATENT DOCUMENTS

| | | |
|---|---|---|
| DE | 195 04 900 | 8/1995 |
| DE | 195 43 504 | 5/1997 |
| FR | 1 371 834 | 9/1964 |
| FR | 0024967 A1 | 3/1981 |
| GB | 1507134 A1 | 4/1978 |

* cited by examiner

*Primary Examiner* — John Rivell
(74) *Attorney, Agent, or Firm* — Coraline J. Haitjema; David Owen; Hoyng Monegier LLP

(57) ABSTRACT

A valve provided with a passage for conveying a medium, the passage having at least a first closable aperture, and with a closing device that is suitable for closing at least the first aperture. The valve is provided with a holder element that is movably included in a holder element house chamber of the holder element house. The closing device is capable of being supported by the holder element or forms an integrated part of the holder element, and the closing device is controllable by the medium. The holder element is controllable, only by the medium, for releasing at least the first aperture by means of the closing device.

16 Claims, 2 Drawing Sheets

VALVE PROVIDED WITH A PASSAGE FOR CONVEYING A MEDIUM AND AN INSTALLATION PROVIDED WITH SUCH A VALVE

CROSS REFERENCE TO RELATED APPLICATIONS

This application claims priority from Dutch patent application number 1030757 filed on 23 Dec. 2005, the contents of which are hereby incorporated by reference in their entirety.

BACKGROUND OF THE INVENTION

1. Field of the Invention

The invention relates generally to a valve and more particularly to a shut-off valve of a type suitable for use in a vacuum line. The invention further relates to an installation including such a valve, in particular a milking installation.

2. Description of the Related Art

Valves are known in which a valve element is located in a flow passage. The valve can close by seating of the valve element on a valve seat within the passage. Opening of the valve may be achieved by movement of an engaging element to move the valve element away from the seat. Such a valve is known from U.S. Pat. No. 6,149,125 which uses a hydraulic arrangement to engage the valve element. A further device is known from U.S. Pat. No. 2,942,618, which uses a magnet to hold the valve element in an open position. The valve element is released by the magnet in response to pressure increases or decreases outside a given range. The pressure range is adjusted by controlling the biasing force on a pair of plungers. In order to release the valve element from a closed position, a complicated arrangement of valves may be provided.

There is thus a need for a simpler and cheaper construction to realize such control.

BRIEF SUMMARY OF THE INVENTION

The present invention addresses these problems by providing a valve with a passage for conveying a medium, the passage having at least a first closable aperture, and with a closing device for closing at least the first aperture, the valve being provided with a holder element that is movably included in a holder element house chamber of a holder element house, the closing device being supported by the holder element or forming an integrated part of the holder element, wherein the holder element is controllable, only by the medium, for releasing at least the first aperture by movement of the closing device. The invention is based on the insight that the intended function is achievable in a mechanically operating valve. The medium actuates the holder element directly, without intervention of electric, hydraulic or pneumatic energization of all kinds of control valves. This leads in a simple manner to an unequivocal switching behaviour of the valve. The absence of electric, hydraulic, pneumatic or magnetic energization of control valves has a considerable cost-saving effect. In particular, resetting of the valve from the closed position to the normal open position takes place automatically by the medium, without actuation by an independently controlled actuator.

The invention also relates to a valve provided with a passage for conveying a medium, the passage having at least a first closable aperture, and with a closing device that is suitable for closing at least the first aperture, the valve being provided with a holder element that is movably included in a holder element house chamber of the holder element house, the holder element being capable of being brought into contact with the closing device, the holder element house chamber being in open connection with a part of the passage by means of a passage duct and the holder element being controllable by the medium, the holder element being capable of being brought, only by the medium, into contact with the closing device for releasing at least the first aperture.

In an embodiment of a valve according to the invention, the part of the passage is located at that side of the first aperture that is closable by the closing device. By means of pressure changes in the holder element house chamber the holder element can now be brought into another position in a simple manner.

In an embodiment of a valve according to the invention, an intermediate element force is capable of being applied, by an intermediate element between a part of the holder element and a part of the holder element house, to a part of the holder element along a direction of movement of the holder element, and a counter element force is capable of being applied, by a counter element between a part of the holder element and a part of the holder element house, to a part of the holder element, which counter element force is in direction opposite to the intermediate element force, and the holder element is movable in the holder element house chamber when a valve threshold value is exceeded, which valve threshold value is that value of the intermediate element force that equals in magnitude the counter element force. A simple way of resulting displacement of the holder element is thus obtained.

In an embodiment of a valve according to the invention, in which the holder element house chamber is in open connection with a part of the passage by means of a passage duct, the holder element divides the holder element house chamber into at least two separate holder element house sub-chambers, at least one holder element house sub-chamber being capable of being filled with the medium to be conveyed, which holder element house sub-chamber capable of being filled is connected with the part of the passage via the passage duct, the intermediate element being the pressure of the medium to be conveyed. The pressure of the medium to be conveyed through the valve now applies, as intermediate element between a part of the holder element and a part of the holder element house, an intermediate element force to a part of the holder element along a direction of movement of the holder element.

In an embodiment of a valve according to the invention, the counter element is adjustable for applying an adjustable counter element force. The valve threshold value of the valve can now be set variably.

In an embodiment of a valve according to the invention, the holder element extends through a wall of the passage and an end of the holder element is capable of being brought to that side of the first aperture that is closable by the closing device. It is now possible for the holder element house enclosing the holder element to be fastened to the outer side of the valve house of the valve, so that the holder element house is well accessible at all times.

In an embodiment of a valve according to the invention, the holder element has a tapering diameter and the diameter is substantially declining in the direction of the passage. In this manner it is achieved that the holder element and the closing device, in a completely open position of the valve, hinder as little as possible a free flow of the medium through the passage of the valve. The holder element should, of course, be prevented as much as possible from acting to some extent as a kind of closing device.

In an embodiment of a valve according to the invention, the holder element consists of a separate at least almost bar-shaped element with a separate at least almost disc-shaped element located at an end of the bar-shaped element, the bar-shaped element extending through the holder element house in the direction of the passage, and the counter element being provided between the disc-shaped element and a part of the holder element house. This appears to be a suitable embodiment for the holder element.

In an embodiment of a valve according to the invention, the centre line of the holder element is at an angle of approximately 45 degrees with the centre line of the passage. With a bar-shaped holder element, the contact surface with the closing device is now minimal, which promotes free passage of the medium.

In an embodiment of a valve according to the invention, the holder element house and/or the holder element are/is fastened at least almost for the greater part in the passage. In embodiments where the passage is sufficiently wide, the described configuration forms a good alternative.

In an embodiment of a valve according to the invention in which the valve comprises a valve house, the holder element house is detachably fastened to the valve house, which facilitates maintenance.

In an embodiment of a valve according to the invention, the closing device is substantially spherical. A spherical closing device in the passage is suitable for counteracting turbulence developing in the passage when a medium is being conveyed.

In an embodiment of a valve according to the invention in which the valve comprises a valve house, at least a first part of the valve house is connectable, by means of a clamped connection, with a line and/or with a second part of the valve house. In relation to, for example, a screwed connection, a clamped connection facilitates quick replacement of the valve house, which, in view of the low cost price of the product, is now within the bounds of possibility. Quick replacement of the product is beneficial to the hygiene of a system in which a valve according to the invention is included.

In an embodiment of a valve according to the invention, the passage has a second closable aperture, the closing device is provided between the first closable aperture and the second closable aperture and the closing device is suitable for individually closing the apertures. For the situations of a pressure difference over the valve equal to zero and unequal to zero (positive and negative) the closing device is now capable of being brought in the valve into the corresponding individual positions.

In an embodiment of a valve according to the invention, there is provided, between the first aperture and the second aperture, at least one passage duct that is suitable for installation of a measuring device. Owing to the fact that, upon injection moulding (or die-casting) the valve, the installation of a measuring device was already taken into account, installation of, for example, a manometer can be performed quickly and in a simple manner.

In an embodiment of a valve according to the invention, there is provided, between the first aperture and the second aperture, at least one passage duct that is suitable for installation of a cleaning device. An immediate, efficient cleaning of the interior of the valve is thus possible.

In an embodiment of a valve according to the invention, the valve comprises holding means for keeping the holder element in a particular position. This facilitates cleaning of the passage of the valve and the closing device itself.

The invention further relates to an installation comprising a first line and a second line, a valve according to any one of the above described embodiments being installed between the two lines or forming an integral whole with them, which installation is provided with a pressure controlling device for controlling a pressure value of the medium and with a controller for controlling the pressure controlling device.

In a preferred embodiment of the installation according to the invention, the installation is an installation for automatically milking an animal. More particularly, the milking installation may comprise a vacuum conduit and a vacuum pump, a valve located between the vacuum conduit and the vacuum pump, the valve comprising: a passage in fluid communication with the vacuum conduit; a valve seat located within the passage; a valve element located within the passage and having a first position in which it engages the valve seat to close the passage and having a second position in which it disengages the valve seat to open the passage; a holder element mounted to engage the valve element and support it in its second position and being movable to allow the valve element to move to its first position; a pressure responsive member operatively mounted to cause the movement of the holder element; and a fluid connection between the pressure responsive member and the vacuum conduit such that the pressure responsive member is exposed to a pressure within the vacuum conduit.

BRIEF DESCRIPTION OF THE DRAWINGS

The features and advantages of the invention will be appreciated upon reference to the following drawings, in which:

FIG. 2-II shows in detail an embodiment of a valve according to the invention, included in an installation shown in FIG. 1, for the situation in which there is a pressure difference over the passage that is not equal to zero, the pressure at the side of the collecting vessel being higher than the pressure at the side of the vacuum pump;

FIG. 2-III shows in detail an embodiment of a valve according to the invention, included in an installation shown in FIG. 1, for the situation in which there is a pressure difference over the passage that is not equal to zero, the pressure at the side of the vacuum pump being higher than the pressure at the side of the collecting vessel.

DESCRIPTION OF ILLUSTRATIVE EMBODIMENTS

Figure 1:
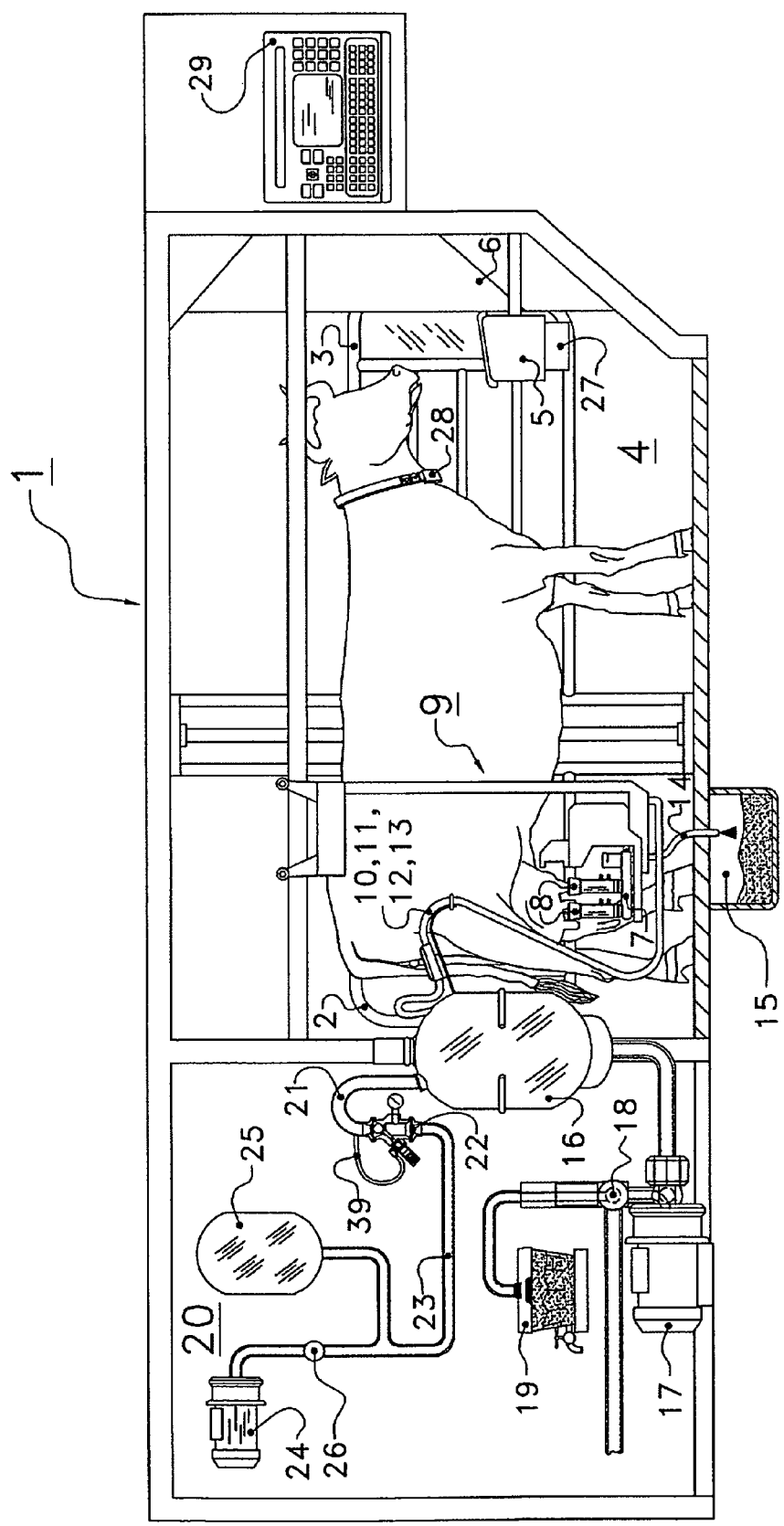
FIG. 1 is a side view of a possible installation, comprising a valve according to the invention.

The following is a description of certain embodiments of the invention, given by way of example only and with reference to the drawings. Referring to FIG. 1, a side view is shown of an installation for automatically milking an animal, in which a valve according to the invention is included. The installation consists of a box construction 1 provided with an entrance gate 2 and an exit gate 3 to enable an animal to enter and to leave, respectively, the animal area 4 of the installation. There is provided a feed trough 5 for supplying feed. A feed metering device 6 meters different sorts of feed in the feed trough 5. The milking installation 7 with four teat cups 8 is fastened to a robot arm 9. The robot arm 9 brings the milking installation 7 to under the animal. Connecting and disconnecting the teat cups 8 to and from, respectively, the teats of the animal takes place automatically. Milk drawn per udder quarter is discharged to a collecting vessel 16 by means of a milk line 10, 11, 12, 13 connected to each teat cup 8.

In the milking installation 7 there are provided flow sensors for measuring the flow of the milk drawn per udder quarter.

The first milk drawn, the foremilk, is discharged to the sewer 15 by means of a discharge hose 14. For this purpose, in each milk line 10, 11, 12, 13 coming from the individual teat cups 8 there is provided a sewer valve to lead the milk selectively to a collecting vessel 16 or to the discharge hose 14. Said valves can be controlled on the basis of the values from the flow sensors. The milk from a milking run that is not discharged to the sewer is collected in the collecting vessel 16. Via a pump 17 and a three-way valve 18, the milk from the collecting vessel 16 can be led selectively to a (non-shown) milk cooling tank or to a separation tank 19.

The driving force for milking is an applied vacuum. To the collecting vessel 16 there is connected, for this purpose, a vacuum circuit 20 belonging to the milking installation 7 and comprising a pump 24 by means of which a vacuum can be applied in a vacuum reservoir 25. In the vacuum circuit 20 there is further included a (non-shown) liquid separator for preventing liquid from getting into the pump 24. There is included a non-return valve 26 between the pump 24 and the connecting point of the vacuum reservoir 25 to a vacuum line 23 to the collecting vessel 16. The valve 22 according to the invention is located between a vacuum line 21 connected with the collecting vessel 16 and a vacuum line 23 connected with the vacuum pump 24. In the commonly used systems there is provided, instead of the valve 22 according to the invention, a valve that is capable of being activated by a computer.

There is provided an animal identification device 27 for identification of an animal that reports at the installation. The animal identification device 27 co-operates with a transponder 28 that an animal wears around its neck. A controller 29 ensures the control of the different components and the data processing.

Figure 2:
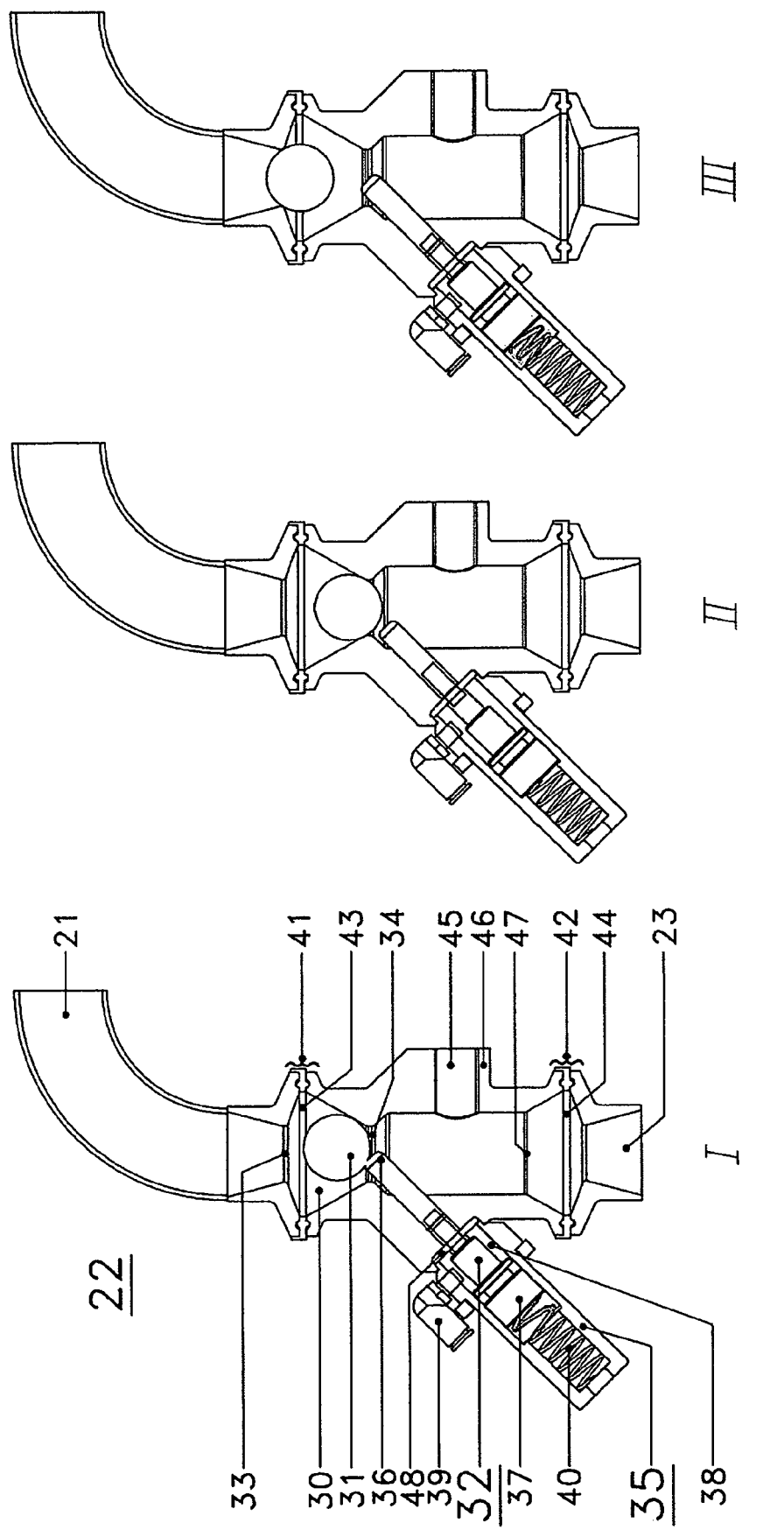
FIG. 2-I shows in detail an embodiment of a valve according to the invention, included in an installation shown in FIG. 1, for the situation in which there is a pressure difference over the passage that is almost equal to zero.

FIG. 2-I shows in detail an embodiment of a valve 22 according to the invention. The valve 22 is provided with a passage 30 for conveying the medium air, the passage 30 comprising a first valve seat or closable aperture 34 and a second valve seat or closable aperture 33. The passage 30 has a tapering diameter that is substantially declining in the normal direction of closable aperture 34. Between the apertures 33, 34 there is provided a valve element or closing device 31 that is suitable for individually closing said apertures 33, 34. Said closing device 31 is capable of being supported by a holder element 32 that is movably included in a holder element house chamber 38 of a holder element house 35. In the illustrated embodiment, the passage 30 is arranged substantially vertically such that the closing device 31 is urged by gravity in the direction of closable aperture 34.

The holder element 32 is controllable, only by the medium, for releasing at least the first closable aperture 34 by means of the closing device 31. In the chosen embodiment, the holder element 32 consists of a rod or bar-shaped element 36 with a disc-shaped element 37 located at an end of the bar-shaped element 36. The disc-shaped element 37 acts as a pressure responsive element as will be described in further detail below. The bar-shaped element 36 extends through the wall of the valve house 46 that is facing the disc-shaped element 37 (or through the wall of the holder element house 35 in another constructive embodiment) into the passage 30 and makes contact with the closing device 31. The disc-shaped element 37 of holder element 32 slides in the holder element house chamber 38 which is capable of being filled with the medium air to be conveyed, by connection with a part of the passage 30. The relevant part of the passage 30 is located at that side of the first closable aperture 34 that is closable by the closing device 31. The other side of the disc-shaped element 37 is exposed to the atmospheric pressure of the ambient air.

The holder element 32 is provided with means for at least almost gas-tightly sealing the holder element 32 with said holder element house sub-chamber 38 in the holder element house 35. The choice of material combinations that are favourable from the point of view of friction for the bar-shaped element 36, the disc-shaped element 37 versus the holder element house 35 needs no further explanation. It is conceivable, for example, to design the disc-shaped element 37 in synthetic material and the holder element house 35, comprising the holder element house chamber 38, in metal or vice versa The centre line of the holder element 32 is at an angle of approximately 45 degrees with the centre line of the passage 30, although it will be obvious that other angle magnitudes may be chosen as well. Apart from this, it is, of course, also possible for the holder element house 35 and/or the holder element 32 to be fastened almost for the greater part in the passage 30.

Between disc-shaped element 37 and the holder element house chamber 38, the pressure of the medium air to be conveyed applies force, as intermediate element, to the holder element 32 along the direction of movement of the holder element 32. There is also provided a counter element 40, in this case a pressure element, for applying a counter element force to a part of the holder element 32, which counter element force is in direction opposite to the intermediate element force. The holder element 32 in the holder element house chamber 38 is movable when a valve threshold value is exceeded, which valve threshold value is that value of the intermediate element force that is in magnitude equal to the counter element force. The pressure element 40 (in this case a spring) presses the holder element 32 against a stop 48 at a pressure difference over the passage that is substantially equal to zero. The counter element 40 is adjustable for applying an adjustable counter element force. In the presently illustrated embodiment, the pressure in the holder element house chamber 38 will generally be below atmospheric pressure and the pressure element 40 will therefore be in tension to bias the holder element 32 away from the passage 30. In the following, reference to intermediate element force is understood to refer to the net force on the holder element 32 due to the difference in pressure between the medium in the vacuum line 21 and ambient pressure.

The holder element 32 extends through a wall of the passage 30 and an end of the holder element is capable of being brought to that side of the first aperture 34 that is closable by the closing device 31. The at least almost gas-tight holder element house chamber 38 in the holder element house 35 is connected, via a passage duct 39, with the vacuum line 21 to the collecting vessel 16, thus with a part of the passage 30 that is located outside the apertures 33, 34 that are positioned at some distance from each other. By means of said passage duct 39, connected with the holder element house chamber 38, the holder element 32 is capable of being brought into contact with the closing device 31 by the medium to be conveyed through the valve 22.

In the embodiment shown, the holder element house 35 is detachably fastened to the valve house 46. At least a first part of the valve house 46 is connectable, by means of a clamped connection 41,42, with a vacuum line 21, 23 and/or with a second part of the valve house 46. In the embodiment shown of the invention, the valve 22 is fastened, by means of clamped connections 41,42, between the vacuum line 21 connected with the collecting vessel 16 and the vacuum line 23 connected with the vacuum pump 24. By applying the clamped connections 41, 42 the valve 22 can easily be replaced. In the clamped connections 41, 42 there are provided hygiene membranes 43, 44 for obviating bacteria The entire valve 22 can be designed in synthetic material in a simple manner. A cheap, light valve construction is thus obtained. The passage 30 has a third aperture 47 and, between the first aperture 34 and the third aperture 47, there is provided at least one passage duct 45 that is suitable for the installation of a manometer. In this context, it is also possible to take the installation of other means on the passage duct 45, such as, for example, a cleaning apparatus, into consideration. In this context, the passage duct 45 is preferably disposed between the first closable aperture 34 and the second closable aperture 33. Cleaning of the closing device 31 and the space between the first closable aperture 34 and the second closable aperture 33, in which the closing device is displaced, can now be carried out thoroughly in a simple manner. For this purpose, the valve 22 comprises (non-shown) holding means for keeping the holder element 32 in a particular position. In line with said possibilities the presence of several passage ducts 45 may now be taken into consideration.

In the situation shown in FIG. 2-I, there is a pressure difference over the passage 30 of the valve 22 that is substantially equal to zero; in the shown installation 1 this is in the situation that the vacuum pump 24 of the installation 1 is operating as pressure controlling device and the animal present in the installation is being milked. The vacuum pump is controlled by the controller 29. The counter element force applied by the pressure element 40 to the holder element 32 is in magnitude at least equal to and in direction opposite to the intermediate element force applied by the pressure of the air as intermediate element to the holder element, via the passage duct 39. The adjustable valve threshold value is not exceeded; the pressure element 40 (in this case a spring) presses the holder element 32 against the stop 48. The passage 30 of the valve 22 is now open for conveying air. The closing device 31 is now supported by a holder element 32, in a position between the first closable aperture 34 and the second closable aperture 33 in the passage 30, in such a way that air can flow in a simple manner through the apertures 33, 34 and along the closing device 31. The substantially spherical closing device 31 contributes to achieve as much as possible an intended laminar flow in the passage 30.

When a particular amount of milk has been collected in the collecting vessel 16, milk is led from the collecting vessel 16 to a milk tank or separation tank 19. Pump 17 as pressure controlling device of the installation I presses the milk from the collecting vessel 16. Pump 17 is controlled by the controller 29. For this situation, FIG. 2-II shows in detail a valve 22 according to the invention. The pressure difference over the passage 30 is not equal to zero, the pressure in the vacuum line 21 connected with the milk collecting vessel 16, and, owing to the presence of the passage duct 39, also the pressure in the almost gas-tight holder element house chamber 38 in the holder element house 35, is now higher than the pressure in the vacuum line 23 connected with the vacuum pump 24. The constructive parameters are now chosen in such a way that the force effected by the pressure on the disc-shaped element 37 is greater than the spring force—working in opposite direction—of the spring 40 in the holder element house 35; the valve threshold value is exceeded. Consequently, the holder element 32 will shift over a distance in the direction of the spring 40. The closing device 31 now comes loose from the holder element 32 and subsequently closes the first closable aperture 34 and thus the vacuum line 23 connected with the vacuum pump 24. In this manner the collecting vessel 16 can be emptied by means of compressed air without great leakage losses. After emptying the situation will again be such that the pressure is equal on either side of the closing device 31. The closing device 31 will then be supported again by the holder element 32 and the valve is now in the open position, as shown in FIG. 2, picture I. In this context it is pointed out that the presence of the passage duct 39 is no essential necessity for realising the inventive idea An embodiment of a valve in which bringing the holder element 32 into contact with the closing device 31 is achieved by a resilient element or a similar functional element, is also within the scope of the inventive idea. In this context, it is possible that a proper choice of valve element parameters (such as, for example: mass, volume, kind of material, dimensions, relative positions, etc.) makes it possible for the closing device 31 to push the holder element 32 (or a closing device integrated with the holder element 32) away and subsequently to close the first closable aperture 34 and thus the vacuum line 23 connected with the vacuum pump 24.

FIG. 2-III shows in detail an embodiment of a valve 22 according to the invention for the situation in which there is a pressure difference over the passage 30 that is not equal to zero, the pressure in the vacuum line 23 connected with the vacuum pump 24 being higher than the pressure in the vacuum line 21 connected with the collecting vessel 16. This situation occurs in the unlikely event of the pump 24 having failed. After the pump 24 has failed, the closing device 31 will come loose from the holder element 32 and will subsequently close the second closable aperture 33 and thus the vacuum line 21 connected with the collecting vessel 16. In this manner the vacuum in the milking system is maintained and cowshed air, with all contaminations present therein, is prevented from getting into the milking system. Milk from the animal thus continues to be optimally protected. When the pump 24, after having been repaired, is put into operation again, the situation will again be such that the pressure is equal on either side of the closing device 31. The closing device 31 will then be supported again by the holder element 32 and the valve is now in its open position, as shown in FIG. 2, picture I.

Thus, the invention has been described by reference to certain embodiments discussed above. It will be recognized that these embodiments are susceptible to various modifications and alternative forms in addition to those described above without departing from the spirit and scope of the invention. Accordingly, although specific embodiments have been described, these are examples only and are not limiting upon the scope of the invention.

What is claimed is:

1. An installation for automatically milking an animal, comprising a first line and a second line and a valve being installed between the two lines, or forming an integral whole with them, which installation is provided with a pressure controlling device for controlling a pressure value of a medium and with a controller for controlling the pressure controlling device, wherein the valve is provided with a passage for conveying the medium, the passage having at least a first closable aperture, and with a closing device for closing at least the first aperture, the valve being provided with a holder element that is movably included in a holder element house chamber of a holder element house, wherein the holder element house chamber is configured to be in fluid communication with the passage, and the pressure value of the medium in the chamber is configured to be substantially the same as the passage during operation, the closing device being supported by the holder element or forming an integrated part of the holder element, wherein the holder element is configured to prevent the closing device from closing, the first closable aperture during operation to allow the medium to flow through the passage between the first and second line, and wherein the holder element is controllable, only by a change in the pressure value the medium, for releasing the closing device to close the first aperture, and wherein the passage has a second closable aperture and the closing device is provided between the first closable aperture and the second closable aperture and is suitable for individually closing the apertures.

2. The installation as claimed in claim 1, wherein the valve further comprises a fluid connection between the passage and the holder element house chamber such that an intermediate element force may be applied to a part of the holder element acting along a direction of movement of the holder element, in that a counter element force is capable of being applied, a counter element acting between a part of the holder element and a part of the holder element house, which counter element force is in direction opposite to the intermediate element force, and in that the holder element is movable in the holder element house chamber when a valve threshold value is exceeded, which valve threshold value is that value of the intermediate element force that equals in magnitude the counter element force.

3. The installation as claimed in claim 2, the holder element house chamber being in open connection with a part of the passage by means of a passage duct, such that the holder element house chamber may be filled with the medium to be conveyed, and in that the intermediate element force is the relative pressure of the medium to be conveyed.

4. The installation as claimed in claim 2, wherein the counter element is adjustable for applying an adjustable counter element force.

5. The installation as claimed in claim 2, wherein the holder element extends through a wall of the passage, and in that an end of the holder element is capable of being brought to that side of the first aperture that is closable by the closing device.

6. The installation as claimed in claim 1, wherein the passage has a tapering diameter in a direction towards the first aperture.

7. The installation as claimed in claim 2, wherein the holder element consists of a separate generally rod-shaped element with a separate, generally disc-shaped element located within the holder element house chamber at an end of the rod-shaped element, the rod-shaped element extending through the holder element house in the direction of the passage and the counter element being provided between the disc-shaped element and a part of the holder element house.

8. The installation as claimed in claim 1, wherein the centre line of the holder element is at an angle of approximately 45 degrees with the centre line of the passage.

9. The installation as claimed in claim 1, wherein the holder element house or the holder element is located substantially within the passage.

10. The installation as claimed in claim 1, the valve comprising a valve house, wherein the holder element house is detachably fastened to the valve house.

11. The installation as claimed in claim 1, wherein the closing device is substantially spherical.

12. The installation as claimed in claim 1, wherein the valve further comprises a valve house, wherein at least a first part of the valve house is connectable, by means of a clamped connection, with a line or with a second part of the valve house.

13. The installation as claimed in claim 1, wherein there is provided, between the first aperture and the second aperture, at least one passage duct for installation of a measuring device or a cleaning device.

14. An installation for automatically milking an animal, comprising a first line and a second line and a valve being installed between the two lines, or forming an integral whole with them, which installation is provided with a pressure controlling device for controlling a pressure value of a medium and with a controller for controlling the pressure controlling device, wherein the valve is provided with a passage for conveying the medium, the passage having at least a first closable aperture, and with a closing device for closing at least the first aperture, the valve being provided with a holder element that is movably included in a holder element house chamber of a holder element house, the holder element house chamber being in fluid communication with a part of the passage by means of a passage duct, and wherein the pressure value of the in the holder element house chamber is configured to be substantially the same as in the passage during operation, wherein the holder element is configured to prevent the closing device from closing the first closable aperture during operation to allow the medium to flow through the passage between the first and second line and the holder element being controllable by the medium and capable of being brought, only by a change in the pressure value of the medium, into contact with the closing device for releasing at least the first aperture, wherein the part of the passage is located at that side of the first aperture that is closable by the closing device, and wherein the passage has a second closable aperture and the closing device is provided between the first closable aperture and the second closable aperture and is suitable for individually closing the apertures.

15. In a milking installation comprising a vacuum conduit and a vacuum pump, a valve located between the vacuum conduit and the vacuum pump, the valve comprising:
- a passage in fluid communication with the vacuum conduit;
- a valve seat located within the passage;
- a second valve seat located between the valve element and the vacuum conduit;
- a valve element located within the passage and having a first position in which it engages the valve seat to close the passage, a second position in which it disengages the valve seat to open the passage, and a third position in which it engages the second valve seat to close the passage;
- a holder element mounted to engage the valve element and support it in its second position and being movable to allow the valve element to move to its first position, and wherein the holder element prevents the valve element from moving to its first position while the valve element is in its third position;
- a pressure responsive member operatively mounted to cause the movement of the holder element upon a pressure differential in the fluid; and
- a fluid connection between the pressure responsive member and the vacuum conduit such that the pressure responsive member is exposed to a pressure within the vacuum conduit, and wherein the pressure is configured to be substantially identical at the pressure responsive member and the vacuum conduit during operation when the valve is in its third position.

16. The installation of claim 15, wherein the passage of the valve is generally vertical and has a diameter that reduces in a downward direction towards the valve seat and wherein the valve element rests on the valve seat in its first position.

* * * * *